United States Patent [19]
Dai et al.

[11] Patent Number: 5,751,952
[45] Date of Patent: *May 12, 1998

[54] NETWORK INTERFACING APPARATUS AND METHOD USING ATTACHMENT PORT AND REPEATER

[75] Inventors: Wei William Dai, San Jose; Yu Kwong Ng, Sunnyvale, both of Calif.

[73] Assignee: Allied Telesyn Int'l Corp., Sunnyvale, Calif.

[*] Notice: The term of this patent shall not extend beyond the expiration date of Pat. No. 5,615,340.

[21] Appl. No.: 755,450

[22] Filed: Nov. 22, 1996

Related U.S. Application Data

[63] Continuation of Ser. No. 278,820, Jul. 21, 1994, Pat. No. 5,615,340.

[51] Int. Cl.$^6$ .................................................. G06F 13/00
[52] U.S. Cl. .................................................. 395/200.8
[58] Field of Search .................................................. 395/200.01

[56] References Cited

U.S. PATENT DOCUMENTS

| | | | |
|---|---|---|---|
| 4,922,503 | 5/1990 | Leone | 370/402 |
| 5,058,109 | 10/1991 | Goldberg et al. | 370/401 |
| 5,177,788 | 1/1993 | Schanning et al. | 380/23 |
| 5,265,123 | 11/1993 | Vijeh et al. | 375/211 |

*Primary Examiner*—Thomas C. Lee
*Assistant Examiner*—Anderson I. Chen

*Attorney, Agent, or Firm*—McCutchen, Doyle, Brown & Enersen

[57] ABSTRACT

An apparatus for interfacing a plurality of nodes to a network includes a plurality of working ports coupled to the nodes, an attachment port coupled to the network, an address table for storing addresses associated with the working ports, an incoming packet controller, and an outgoing packet controller. The incoming packet controller receives an incoming information packet from the network via the attachment port, and determines whether a destination address contained in the incoming packet matches one of the addresses stored in the address table. If a destination address match is found, then it is concluded that the incoming packet is intended for one of the working ports. Consequently, the incoming packet is sent to the working ports. If no destination address match is found, the incoming packet controller prevents the packet from being sent to the working ports, thereby eliminating unnecessary signal traffic to the ports. Similarly, the outgoing packet controller receives an outgoing information packet from one of the working ports, and determines whether an outgoing address contained in the packet matches any of the addresses in the address table. If an outgoing address match is found, then it is known that the packet is intended for one of the working ports. As a result, the outgoing packet is not sent to the network but is instead repeated to the working ports. On the other hand, if an outgoing address is not found, then the outgoing packet is sent to the network via the attachment port. By sending only non-local packets onto the network, the apparatus of the present invention reduces network traffic, thereby increasing network efficiency.

20 Claims, 14 Drawing Sheets

NETWORK INTERFACING APPARATUS AND METHOD USING ATTACHMENT PORT AND REPEATER

"This application is a continuation of application Ser. No. 08/278,820 filed on Jul. 21, 1994 which has since been issued as U.S. Pat. No. 5,615,340."

FIELD OF THE INVENTION

This invention relates generally to local area networks and more particularly to an apparatus and method for efficiently and cost-effectively interfacing a plurality of nodes to a network.

BACKGROUND OF THE INVENTION

Local area networks are used on a regular basis to link together multiples nodes, such as personal computers, workstations, servers, etc., to allow the nodes to share information and resources with each other. For small networks, a simple configuration may be used wherein each of the nodes is coupled directly to the network backbone. For more complicated networks having large numbers of nodes, however, direct coupling becomes highly inefficient. To improve efficiency on the more complicated networks, the method of "segmenting" is often applied. According to this method, the various nodes in the network are separated into a plurality of groups known as "segments", with each segment typically comprising a plurality of nodes which communicate regularly with each other. All of the nodes in a segment are usually networked to each other to form a sub-network, and the segment is coupled to the network backbone through a single segment port. By coupling the nodes to the network and to each other in this manner, connectivity with the network backbone is preserved while keeping to a minimum the number of ports actually coupled to the backbone. For even more complicated networks, each segment may be divided into sub-segments, and these sub-segments may be further divided into super sub-segments to create a complex hierarchy. The segmenting principle can be extended to any desired level. Segmenting nodes in this manner has been found to improve network efficiency.

A device which is commonly used in segmenting applications is a bridge. A bridge provides a link between two entities. The coupled entities may be two separate segments or they may be a network and a segment. Currently, a wide variety of bridges are available, with most bridges being general purpose bridges having two sides, each side dealing with a large number of nodes as well as other bridges. A typical bridge comprises a first controller for dealing with a first side of the bridge, and a second controller for dealing with a second side of the bridge. In operation, the first controller receives an information packet from one of the nodes on the first side, and determines whether the packet is destined for one of the nodes on that same side (the first side). If so, the packet is prevented from being sent to the second side. If, however, the packet is not destined for the same side, the first controller assumes that it is destined for the other side (the second side) and sends the packet to that other side. The second controller functions in a similar fashion.

Notice from the above description that when a packet is sent from one side to the other, there is no verification that the packet is actually destined for one of the nodes on the receiving side. There is only verification that the packet is not destined for the side on which the packet originated. As a result, it is possible that each side of the bridge may receive from the other side extraneous packets which were not actually destined for the receiving side. These extraneous packets impose unnecessary traffic on the receiving side which, in turn, adversely affects the efficiency of that side. A more efficient interfacing device is needed.

Another drawback of the currently available bridges is that they are too costly for many applications. Because the available bridges are general purpose devices, they are relatively versatile, and along with this versatility comes higher cost. While versatility may be useful in some situations, it is not needed in many straightforward applications. For example, if all that is needed is to interface a segment having a plurality of nodes to a network, using a general purpose bridge is a waste of resources. For such applications, a simple and more cost effective interfacing device would be more desirable. Such a device, however, is not believed to be currently available.

SUMMARY OF THE INVENTION

In view of the shortcomings of the prior art, the present invention provides a cost effective and efficient apparatus for interfacing a plurality of nodes to a network. The apparatus of the present invention preferably comprises a plurality of working ports for coupling to the plurality of nodes, an address table for storing the addresses of the working ports, an attachment port for coupling to a network, an incoming packet controller, and an outgoing packet controller. In operation, the apparatus of the present invention receives an incoming information packet from the network through the attachment port, and passes the packet on to the incoming packet controller. The controller extracts a destination address from the packet and determines whether it matches one of the addresses stored in the address table. If an address match is found, then it is determined that the packet is destined for one of the working ports, and in response, the controller sends the incoming packet to the working ports. On the other hand, if no destination address match is found, the controller prevents the incoming packet from being sent to the working ports. By so doing, the controller ensures that no unnecessary signal traffic is imposed on the working ports.

With regard to outgoing information packets sent by the working ports, the outgoing packet controller receives such packets and determines whether an outgoing address (which in effect is a destination address) contained in the packet matches one of the addresses in the address table. If an address match is not found, the outgoing packet is sent to the network via the attachment port. However, if an address match is found, it means that the packet is destined for one of the working ports. In such a case, the outgoing controller allows the packet to be repeated to the working ports but prevents it from being sent to the network. By so doing, the outgoing controller prevents extraneous packets from cluttering up the network, thereby increasing network efficiency.

The apparatus of the present invention preferably further comprises a packet scrambler and a cascade interface. The packet scrambler provides, for each information packet destined for one of the working ports, a scrambled information packet which is sent to all of the working ports except for the port for which the information packet is destined. This serves to ensure that only the intended node receives the information packet. The packet scrambler increases information security by making it more difficult for one node to monitor information flowing into and out of the other nodes. The cascade interface provides additional circuitry and logic for accommodating the coupling of additional working ports to the apparatus of the invention. This cascade interface gives the apparatus of the invention the ability to freely expand the number of working nodes that it interfaces to the network without altering the basic apparatus configuration.

BRIEF DESCRIPTION OF THE DRAWINGS

FIG. 11 is an operational flow diagram for the cascade interface 100a.

DETAILED DESCRIPTION OF THE PREFERRED EMBODIMENT

Figure 1:
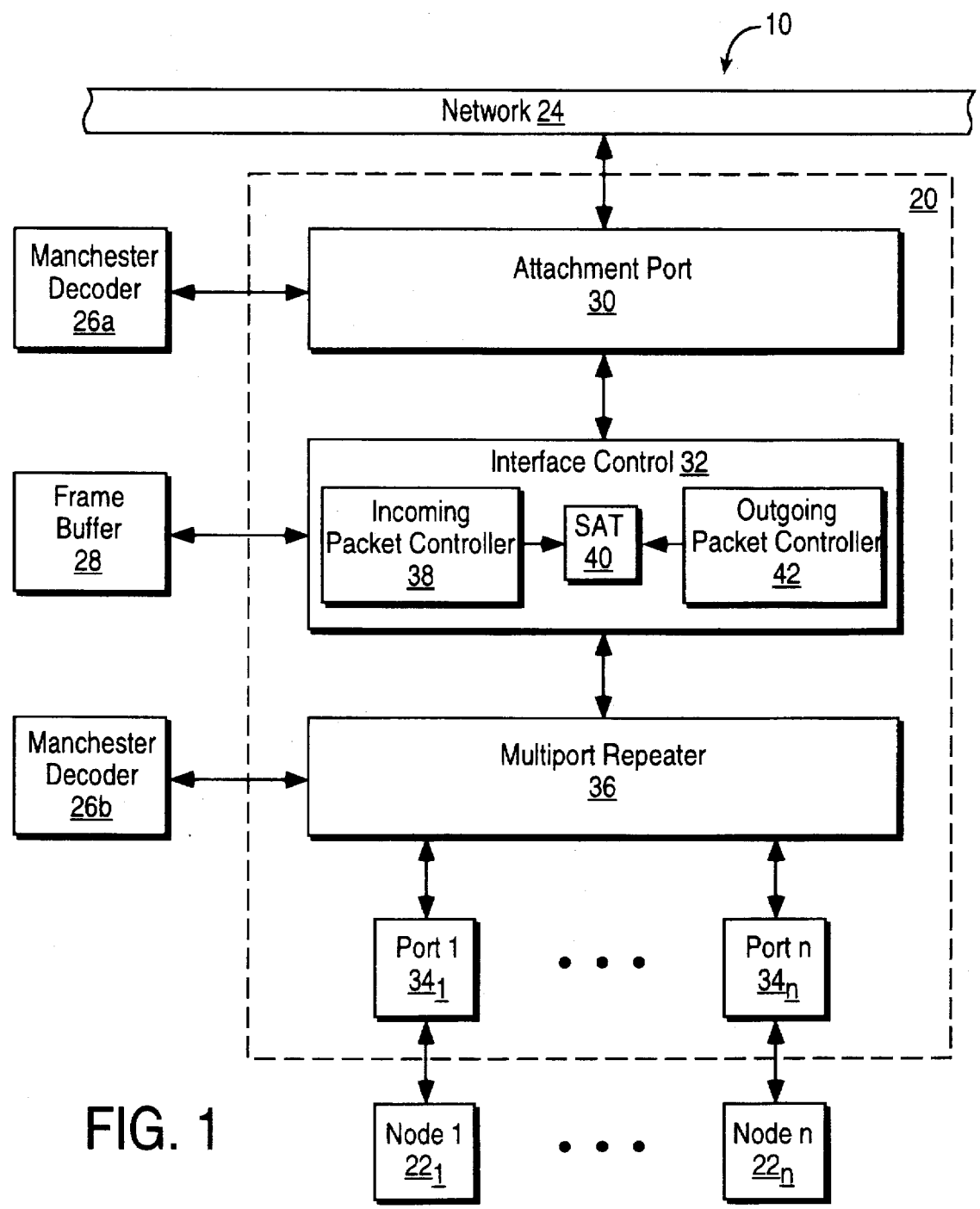
FIG. 1 is a functional block diagram of a system 10 in which the apparatus 20 of the present invention may be implemented.

With reference to FIG. 1, there is shown a system 10 in which the apparatus 20 of the present invention may be implemented to interface a plurality of nodes $22_1$–$22_n$ to a network 24. Network 24 may be an Ethernet or some other type of network, and the network portion to which apparatus 20 is coupled may be the network backbone, a link between other segments, or some other link to an overall network. The nodes $22_1$–$22_n$ which are interfaced with network 24 may be personal computers, workstations, servers, or some other type of data terminal equipment. Apparatus 20 is designed to be able to interface a wide variety of components to the network 24. In addition to nodes 22 and network 24, apparatus 20 is also preferably coupled to Manchester decoders 26a, 26b and frame buffer 28. As will be explained below, these external components 26a, 26b, 28 aid the apparatus 20 in performing its interfacing function.

As shown in FIG. 1, apparatus 20 preferably comprises an attachment port 30, an interface control 32, a plurality of working ports $34_1$–$34_n$, and a multiport repeater 36. The attachment port 30 couples apparatus 20 to network 24 to serve as an interface thereto. It is through port 30 that incoming information packets are received from network 24 and outgoing information packets are sent to network 24. The repeater 36 and working ports $34_1$–$34_n$ together form an interface to the nodes 22. Preferably, each port $34_1$–$34_n$ is coupled to only one node, and all of the ports $34_1$–$34_n$ are preferably coupled to each other by repeater 36 so that all of the nodes $21_1$–$22_n$ can freely share information with each other.

Information packets enter and exit apparatus 20 through attachment port 30 and working ports 34. Which packets are actually transferred from working ports 34 to attachment port 30, and vice versa, is controlled by interface control 32. Interface control 32 preferably comprises an incoming packet controller 38, a source address table (SAT) 40 for storing the addresses of the working ports 34, and an outgoing packet controller 42. To describe the operation of controllers 38 and 42, reference will be made to FIGS. 2 and 3, wherein operational flow diagrams are provided for controllers 38 and 42, respectively.

Figure 2:
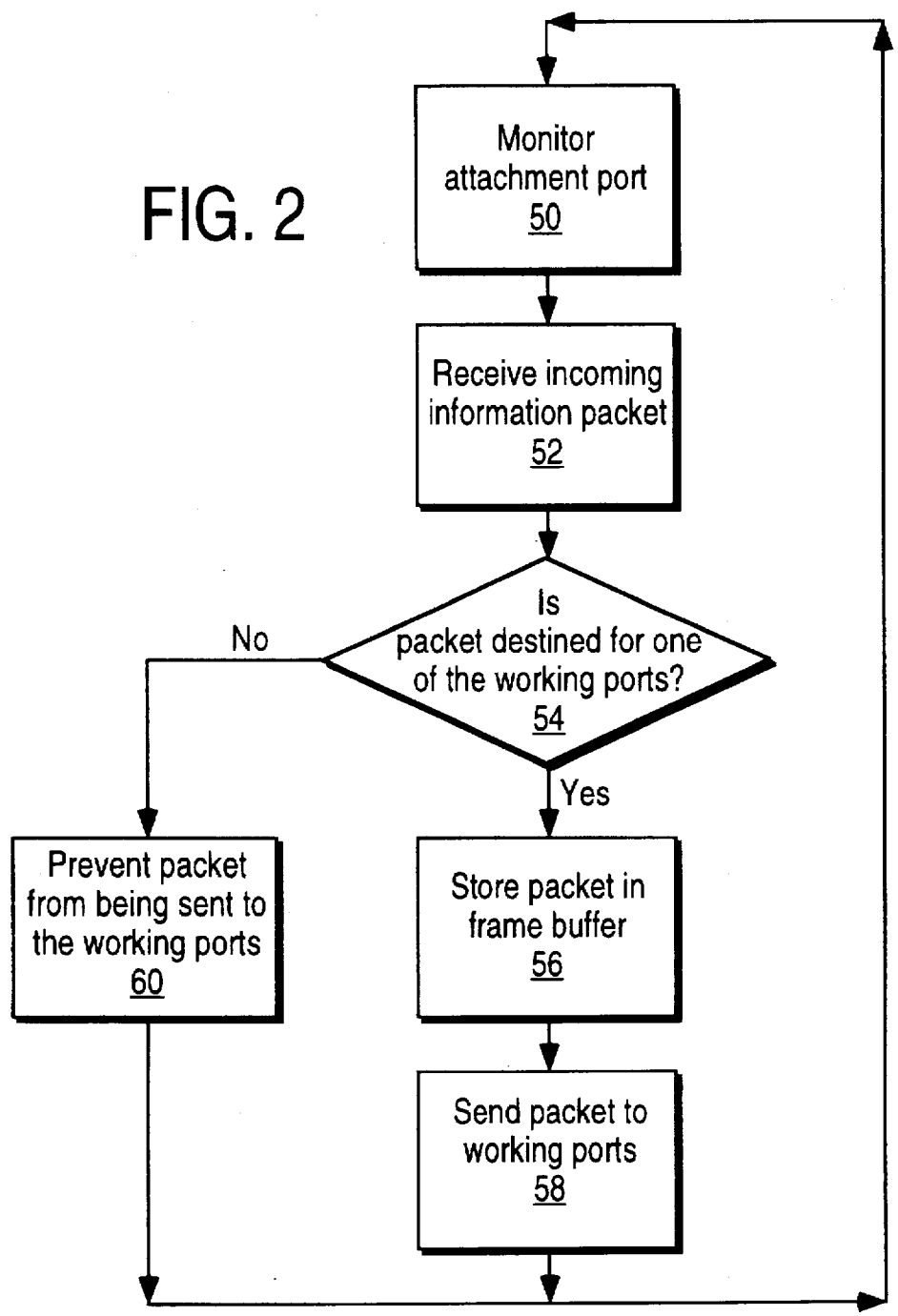
FIG. 2 is an operational flow diagram for the incoming packet controller 38 of FIG. 1.

As shown in FIG. 2, the incoming packet controller 38 operates by first monitoring 50 the attachment port 30 for incoming information packets from the network 24. When an incoming packet is detected, controller 38 receives 52 the packet, and determines 54 whether the packet is destined for one of the working ports 34. This determination is preferably carried out by extracting a destination address from the incoming packet and comparing this address to the addresses stored in the SAT 40. If a destination address match is found, it means that the packet is destined for one of the working ports 34. In response, controller 38 temporarily stores 56 the packet in frame buffer 28 and thereafter sends 58 the packet to the multiport repeater 36, which in turn, broadcasts the packet to the working ports 34. On the other hand, if a destination address match is not found, controller 38 prevents 60 the packet from being sent to the working ports 34 so that no unnecessary signal traffic is imposed on the working ports 34. This helps to optimize signal traffic within the working port segment.

Figure 3:
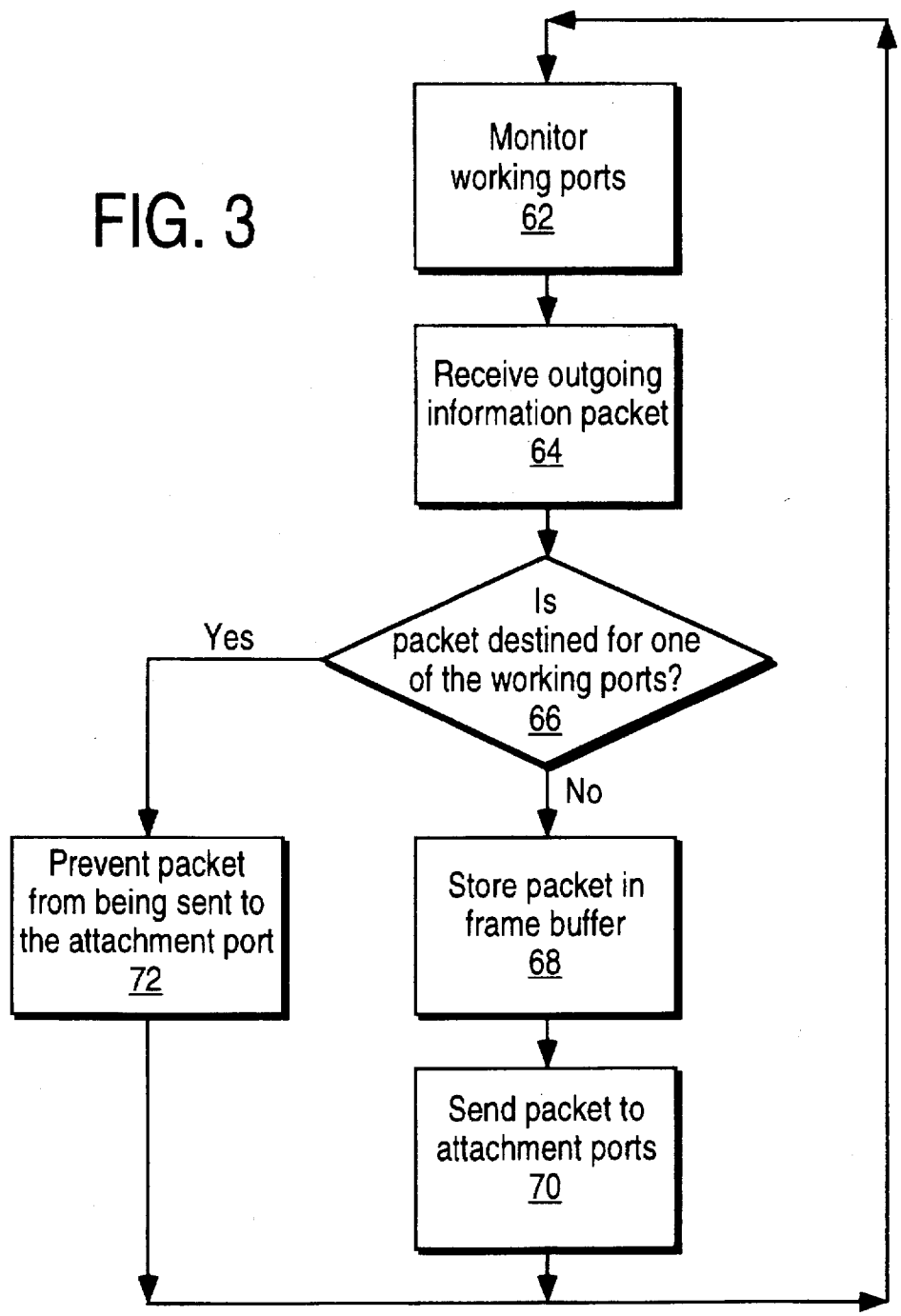
FIG. 3 is an operational flow diagram for the outgoing packet controller 42 of FIG. 1.

Outgoing packet controller 42 functions in a similar manner. As shown in FIG. 3, controller 42 begins operation by monitoring 62 the working ports 34 for outgoing information packets. When an outgoing packet is detected, controller 42 receives 64 the packet and determines 66 whether it is destined for one of the working ports 34 or for the network 24. Preferably, the outgoing packet contains an outgoing address which specifies the intended destination of the packet. Controller 42 compares the outgoing address with the addresses stored in the SAT 40, and if there is an address match, the controller 42 knows that the packet is destined for one of the working ports 34 and not for the network 24. In response, controller 42 allows the packet to be repeated to the working ports 34 so that the packet may reach its intended destination, but prevents 72 the packet from being sent to the network 24. By so doing, controller 42 localizes inter-working port traffic and prevents unnecessary network traffic. If, on the other hand, the outgoing address does not match any of the addresses in the SAT 40, then it means that the outgoing information packet is destined for an external node, i.e. a node on the network 24. In such a case, controller 42 temporarily stores 68 the packet in frame buffer 28 and thereafter sends 70 the packet to the network 24 via the attachment port 30. Signal traffic is thus coordinated by the apparatus 20 of the present invention.

Figure 4:
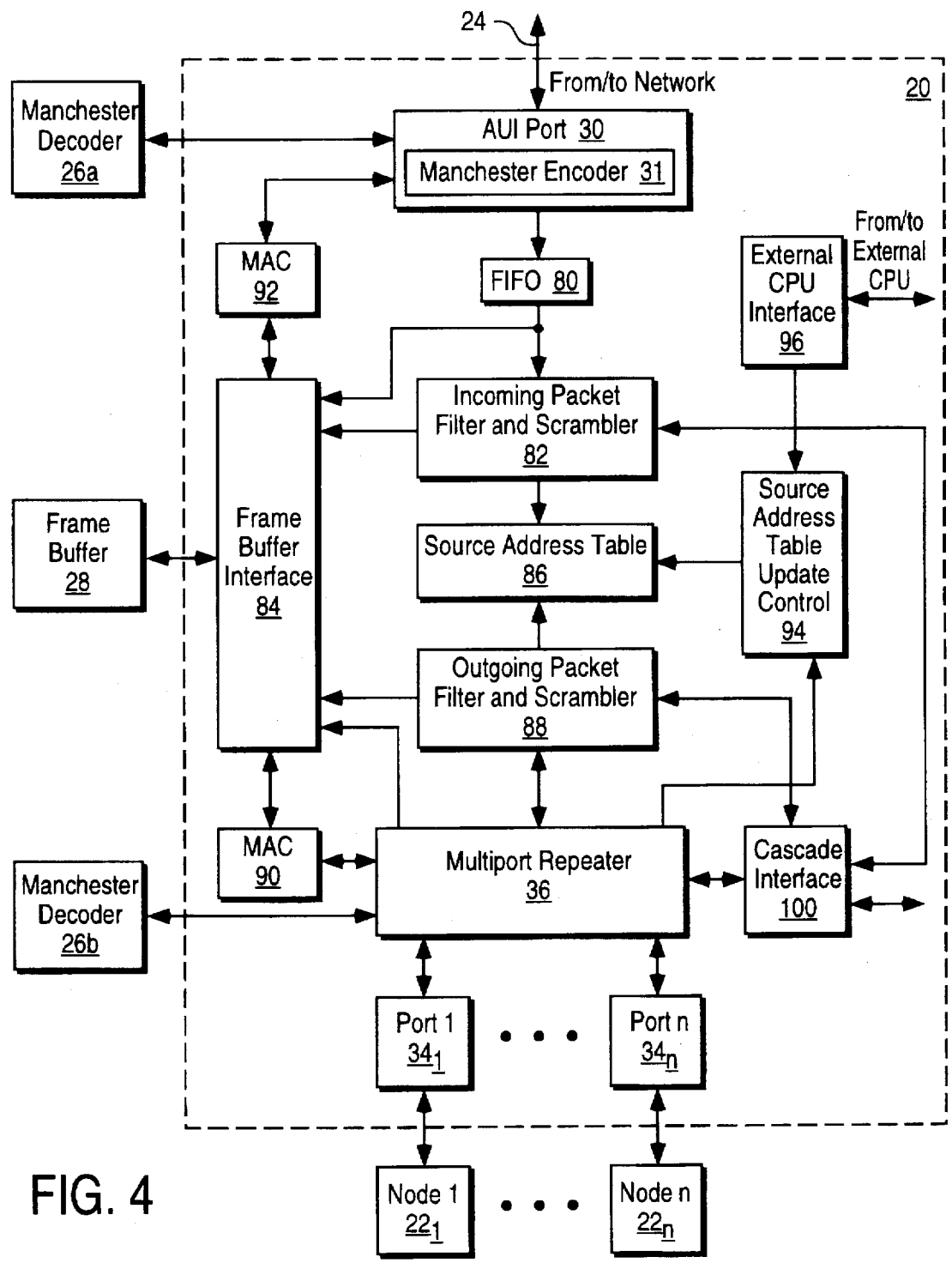
FIG. 4 is a detailed block diagram of the apparatus 20 of the present invention.

With reference to FIG. 4, apparatus 20 will now be described in greater detail. As shown in FIG. 4, apparatus 20 preferably first comprises an attachment port 30 for interfacing with network 24. In the preferred embodiment, port 30 takes the form of an attachment unit interface (AUI) port 30 (in conformance with the IEEE 802.3 AUI port standard) which is coupled to network 24 to receive information packets therefrom and to send information packets thereto.

The network 24 to which port 30 is coupled is preferably an Ethernet, and on this type of network, information packets are typically transmitted in Manchester encoded format. Thus, port 30 preferably comprises a Manchester encoder 31 for converting data into the proper format, and port 30 is preferably coupled to external Manchester decoder 26a for sending encoded data thereto and receiving decoded data therefrom. Port 30 is preferably further coupled to first-in-first-out packet buffer (FIFO) 80 and media access controller (MAC) 92. The function of FIFO 80 is to receive incoming information packets from port 30 and to temporarily store these packets for subsequent processing. FIFO 80 relieves the apparatus 20 of the burden of having to process the packets as they are received. The function of MAC 92 is to implement the protocol and control functions necessary for transferring data between port 30 and frame buffer 28. Preferably, MAC 92 is of general construction and is in conformance with the IEEE 802.3 MAC standard. Together, port 30, FIFO 80, and MAC 92 form the interface to the network 24.

The interface to the nodes 22 is formed by working ports 34, multiport repeater 36, and MAC 90. Ports $34_1$–$34_n$ are each preferably coupled to one corresponding node $22_1$–$22_n$ to exchange signals therewith, and all of the ports 34 are preferably coupled to each other by repeater 36 to allow the ports 34 to communicate with each other. In accordance with the present invention, working ports 34 may be of any type, but in the preferred embodiment, they take the form of twisted pair ports which are in conformance with the IEEE 802.3 10BASE-T standard. From time to time, it is necessary for signals to be exchanged between repeater 36 and frame buffer 28. This signal exchange is controlled by MAC 90, which implements the necessary protocol and control functions. MAC 90 is preferably of standard construction and is in conformance with the IEEE 802.3 MAC standard.

As mentioned above, repeater 36 couples all of the working ports 34 to each other. Repeater 36 is preferably a broadcast repeater, conforming with the IEEE 802.3 repeater standard, which sends every message from or to any working port 34 to all of the other working ports 34. For security reasons, however, it may not always be desirable for all nodes to receive all information. Thus, in the preferred embodiment, each working port 34 further comprises a scrambling mechanism (not shown) for selectively providing scrambled signals to its corresponding node. This mechanism preferably takes the form of a multiplexer having two inputs. A first input is coupled to repeater 36 for receiving the actual information, and a second input is coupled to a scrambled signal source (not shown). Which input is coupled to the multiplexer output is controlled by a select control signal. Thus, by sending the proper control signals to ports 34, each of the working ports 34 can be made to send either actual information or scrambled information to its corresponding node. Signal security within the system is thus enhanced.

Thus far, the interfaces to the network 24 and the nodes 22 have been described. The mechanism which controls the interaction between these two interfaces comprises the incoming packet filter and scrambler 82, outgoing packet filter and scrambler 88, source address table 86, and frame buffer interface 84. Preferably, source address table 86 contains the addresses of all of the active working ports 34 in apparatus 20. These addresses are checked by components 82 and 88 for packet filtering purposes. In the preferred embodiment, incoming packet filter 82 and frame buffer interface 84 work together to carry out the functions of the incoming packet controller 38 shown in FIG. 1, and outgoing packet filter 88 and frame buffer interface 84 cooperate to function as the outgoing packet controller 42. Components 82, 84, 88 are preferably implemented using hardware logic, but it should be noted that the functions of these components 82, 84, 88 may also be implemented by a processor under the control of a software program.

Figure 5:
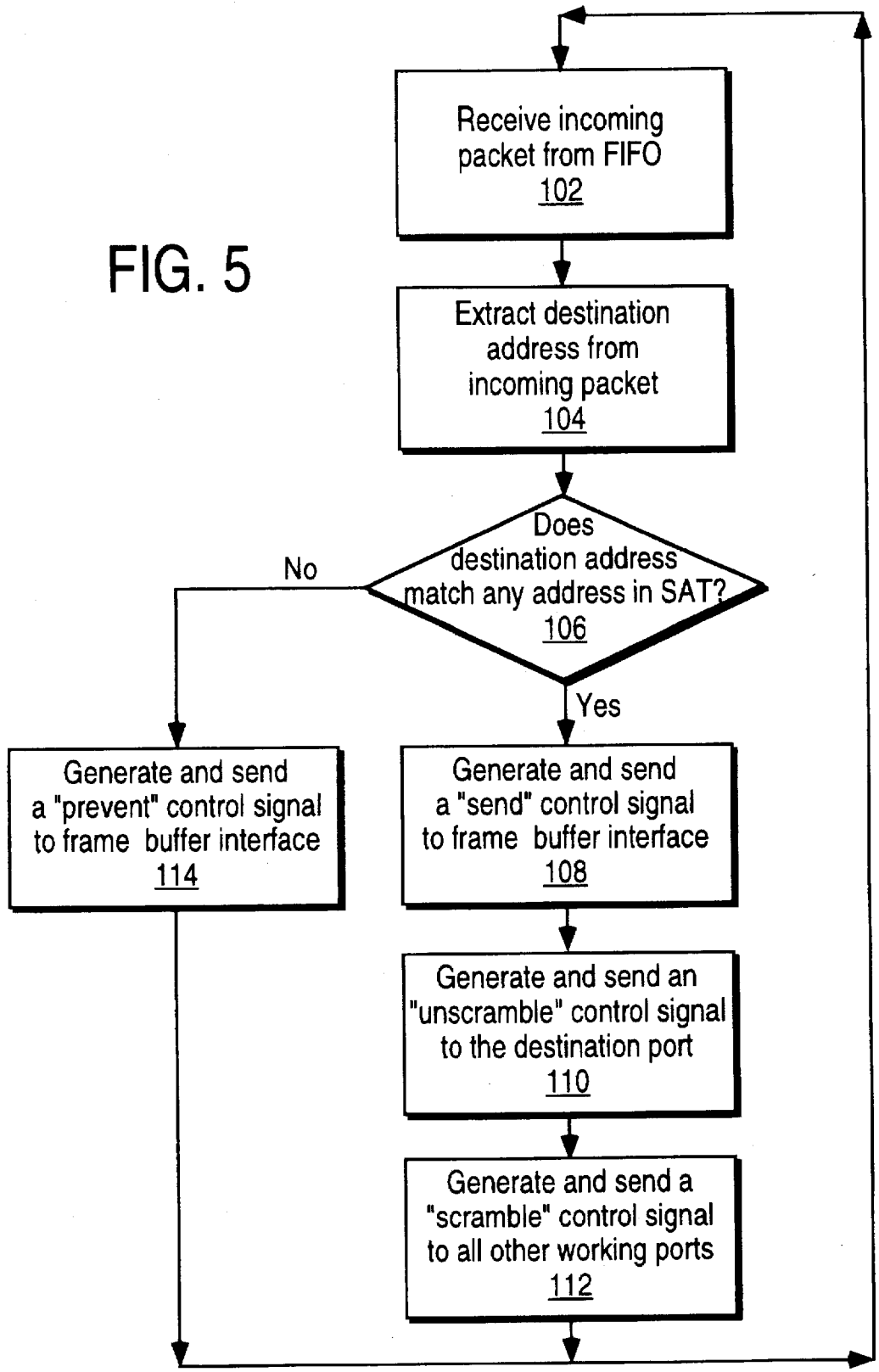
FIG. 5 is an operational flow diagram for the incoming packet filter and scrambler 82 of Fig. 4.
Figure 6:
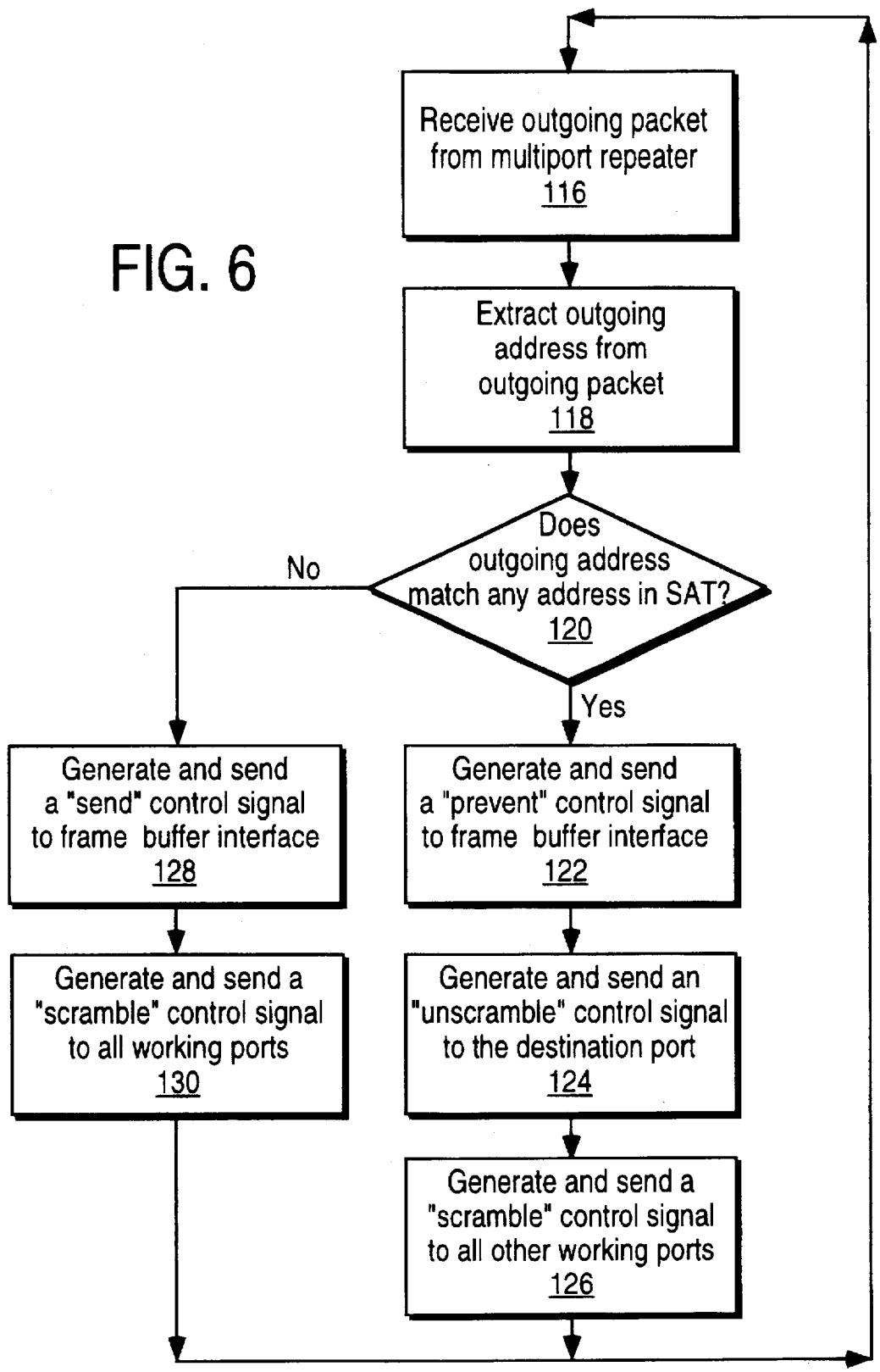
FIG. 6 is an operational flow diagram for the outgoing packet filter and scrambler 88 of FIG. 4.
Figure 7:
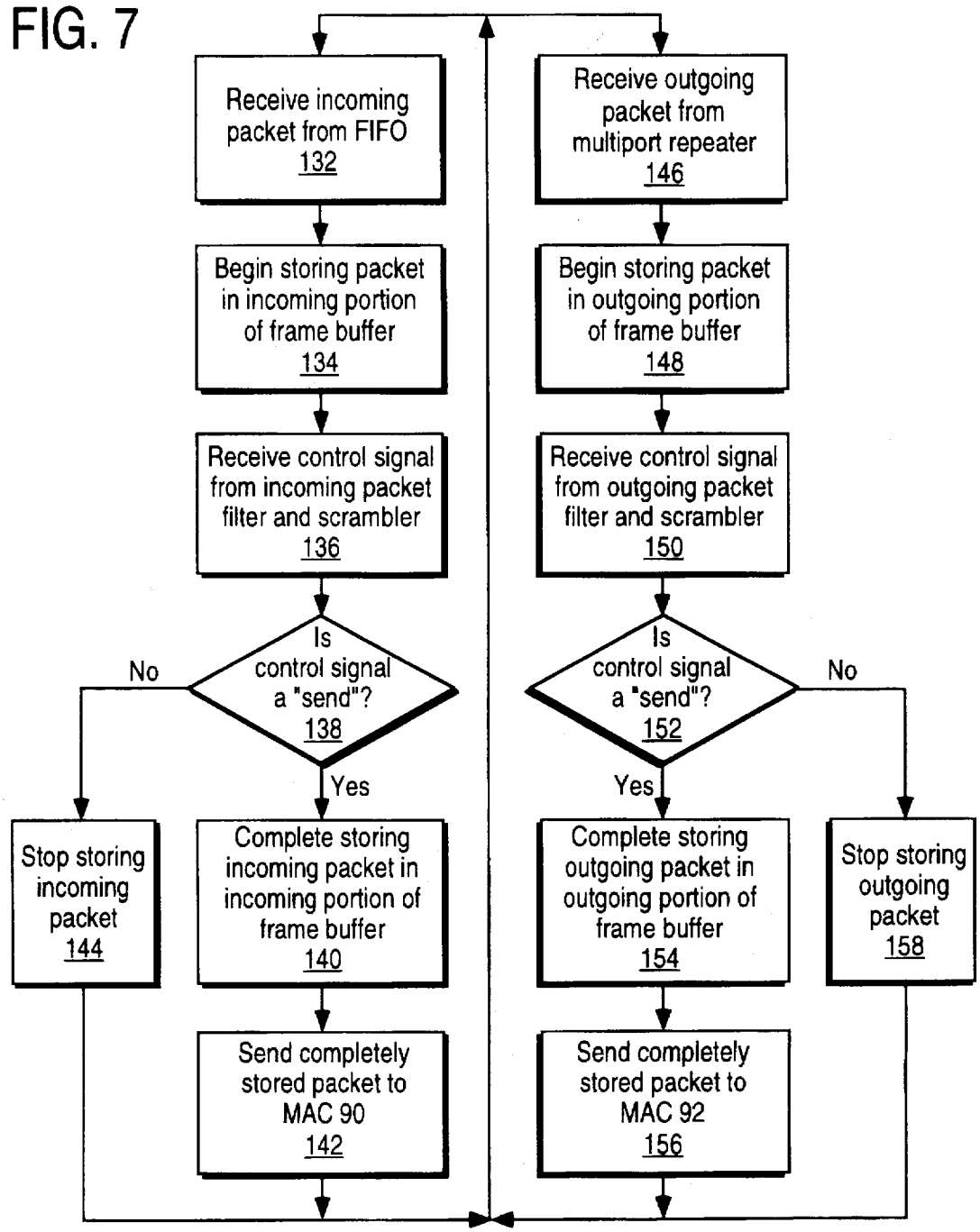
FIG. 7 is an operational flow diagram for the frame buffer interface 84 of FIG. 4.

Components 82, 88 and 84 will now be described in greater detail. FIGS. 5, 6, and 7 provide operational flow diagrams for incoming packet filter and scrambler 82, outgoing packet filter and scrambler 88, and frame buffer interface 84, respectively. As shown in FIG. 5, filter 82 begins operation by receiving 102 an incoming information packet from the FIFO 80. Filter 82 extracts 104 a destination address from this packet and compares it to the addresses stored in SAT 86 to determine 106 whether there is a destination address match. If no address match is found, it means that the packet is not destined for one of the working ports 34. Thus, filter 82 generates and sends 114 a "prevent" control signal to buffer interface 84 to prevent the interface 84 from sending the packet to the ports 34. On the other hand, if an address match is found, then it can be concluded that one of the working ports $34_1$–$34_n$ is the intended destination of the packet. Consequently, filter 82 generates and sends 108 a "send" control signal to the buffer interface 84 to instruct the interface 84 to send the packet on to the working ports 34. In addition, filter 82 generates and sends 110 an "unscramble" control signal to the scrambling mechanism of the destination port, and generates and sends 112 a "scramble" control signal to the scrambling mechanisms of all of the other working ports 34. These control signals cause scrambled packets to be sent to every node except for the node coupled to the destination port. By so doing, filter 82 ensures that only the destination node receives the actual information. Hence, none of the nodes 22 in the segment can monitor information sent to the other nodes 22.

Frame buffer interface 84 works in conjunction with filter 82 to perform the incoming packet filtering function. With reference to the left portion of FIG. 7, buffer interface 84 begins operation by receiving 132 an incoming packet from the FIFO 80. As soon as interface 84 receives the packet, it begins storing 134 the packet in a section of the frame buffer 28 reserved for incoming packets. As the packet is being stored, interface 84 receives 136 a control signal from filter 82. This control signal may be a "send" signal or it may be a "prevent" signal. If a "prevent" signal is received, interface 84 stops storing 144 the incoming packet, which in effect, causes the packet to be discarded. Hence, the incoming packet is not forwarded to the ports 34. If, however, a "send" control signal is received, interface 84 completes the storing 140 of the incoming packet and, at the appropriate time, sends 142 the completely stored packet to MAC 90 for forwarding to repeater 36. The incoming packet is thus passed on to repeater 36 and eventually to the desired destination node.

Referring now to FIG. 6, the outgoing packet filter and scrambler 88 operates in a similar fashion. Filter 88 begins by receiving 116 an outgoing packet from the multiport repeater 36. This packet may have originated from any of the nodes 22 coupled to ports 34. Filter 88 extracts 118 an outgoing address from this packet and compares 120 it to the addresses stored in SAT 86. If an address match is found, it means that the packet is destined for one of the ports 34 in the segment; thus, the packet need not be sent on to the network 24. In such a case, filter 88 generates and sends 122 a "prevent" control signal to interface 84 to prevent interface 84 from forwarding the packet on to network 24. In addition, filter 88 generates and sends 124 an "unscramble" control signal to the scrambling mechanism of the destination port, and generates and sends 126 a "scramble" control signal to the scrambling mechanism of all of the other ports. These control signals cause each of the ports 34, except for the destination port, to send a scrambled packet to its corresponding node. Thus, only the node attached to the destination port receives the actual packet. If, on the other hand, no outgoing address match is found, it can be concluded that the packet is destined for an external node on the network 24. Hence, filter 88 generates and sends 128 a "send" signal to interface 84 to instruct the interface 84 to forward the packet on to the network 24. In addition, filter 88 generates and sends 130 a "scramble" control signal to the scrambling mechanisms of all of the working ports 34. This prevents all of the nodes 22 from receiving the outgoing packet, which is destined for an external node. Signal security is thus preserved.

As was the case with filter 82, frame buffer interface 84 interacts with filter 88 to carry out the outgoing packet filtering function. Interface 84 performs its function by first receiving 146 an outgoing packet from repeater 36. As soon as this packet is received, interface 84 begins storing 148 the packet in a portion of the frame buffer 28 reserved for outgoing packets. While the packet is being stored, interface 84 receives 150 a control signal from filter 88. If the signal is not a "send" signal but is rather a "prevent" signal, then interface 84 stops storing 158 the packet. This in effect discards the packet, thereby preventing the packet from being sent to network 24. On the other hand, if the control signal from filter 88 is a "send" signal, interface 84 completes storing 154 the packet in frame buffer 28 and, at an appropriate time, sends 156 the completely stored packet to MAC 92. MAC 92 thereafter forwards the packet to attachment port 30 and eventually to network 24. In this manner, outgoing packets from nodes 22 are sent to external nodes coupled to the network 24.

The components described thus far implement the primary packet filtering/scrambling functions of the apparatus 20. To enhance functionality, apparatus 20 preferably further comprises an SAT update control 94 and an external CPU interface 96 (FIG. 4). These components 94, 96 facilitate the maintenance of the SAT 86. As shown in FIG. 4, CPU interface 96 preferably couples SAT update control 94 to an external CPU. Interface 96 receives instructions from the external CPU and passes these instruction on to update control 94. Update control 94 receives these instructions, as well as signals from repeater 36, and maintains the SAT 86 accordingly. An operational flow diagram for update control 94 is provided in FIG. 8. In the preferred embodiment, update control 94 is preferably implemented in hardware logic, but it should be noted that control 94 may also be implemented using a processor and software. Interface 96 is likewise preferably implemented using hardware logic. The structure of interface 96 will vary depending upon which processor is used as the external processor. Thus, interface 96 is implementation-specific.

Figure 8:
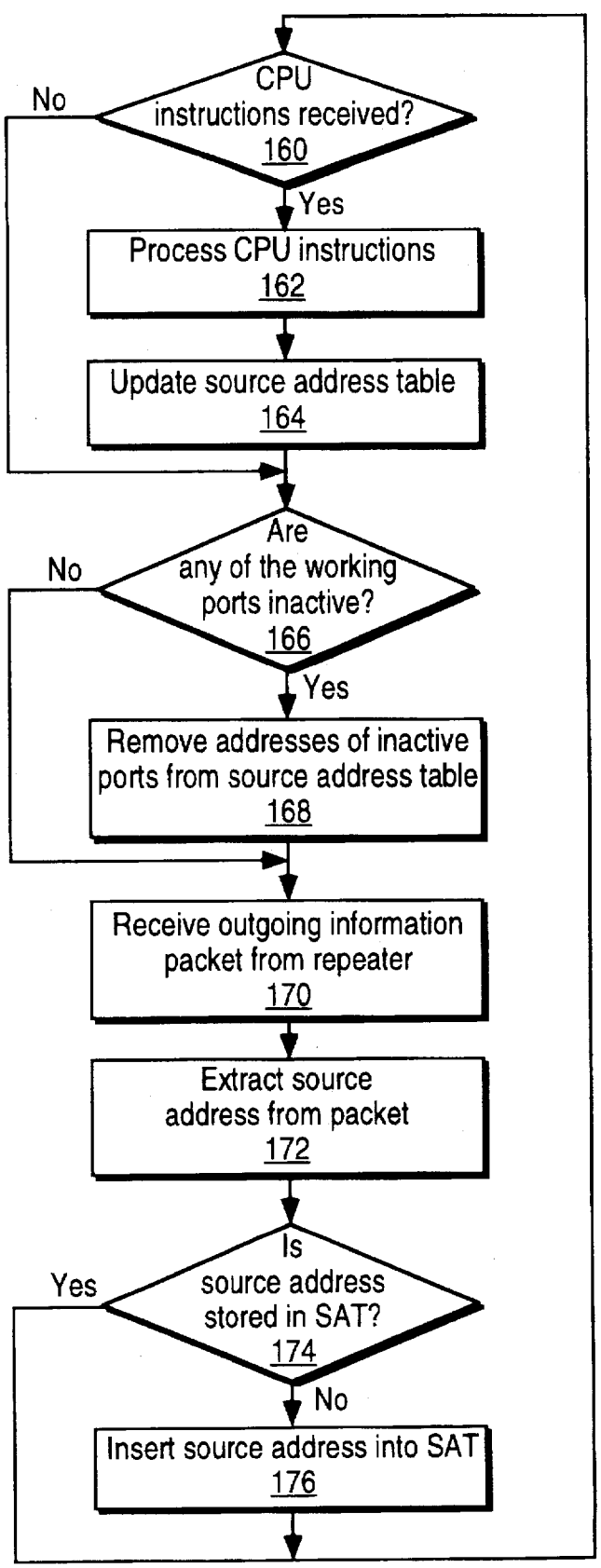
FIG. 8 is an operational flow diagram for the SAT update control 94 of FIG. 4.

With reference to FIG. 8, update control 94 preferably functions by first determining 160 whether instructions have been received from the external CPU. If instructions have been received, control 94 processes 162 the CPU instructions and updates 164 the SAT 86 accordingly. The instructions may cause control 94 to remove an address from table 86 or they may cause control 94 to add new addresses to the table 86. Once the CPU instructions are processed, control 94 makes a determination 166 as to whether any of the working ports $34_1$–$34_n$ has been rendered inactive. If any working port is inactive, the address of that port is removed 168 from the address table 86 so that the port is no longer recognized as a possible destination port. Once this is carried out, control 94 proceeds to receive 170 an outgoing information packet from repeater 88. The outgoing packet preferably contains within it a source address specifying from which port the packet originated. Control 94 extracts 172 this source address from the packet and compares 174 it to the addresses contained in SAT 86. If the source address is not stored in SAT 86, control 94 inserts 176 the source address into the SAT 86. Hence, control 94 automatically adds working port addresses to SAT 86. Overall, update control 94 ensures that fresh, current addresses reside within SAT so that packet filtering functions may be performed efficiently and accurately.

Figure 9:
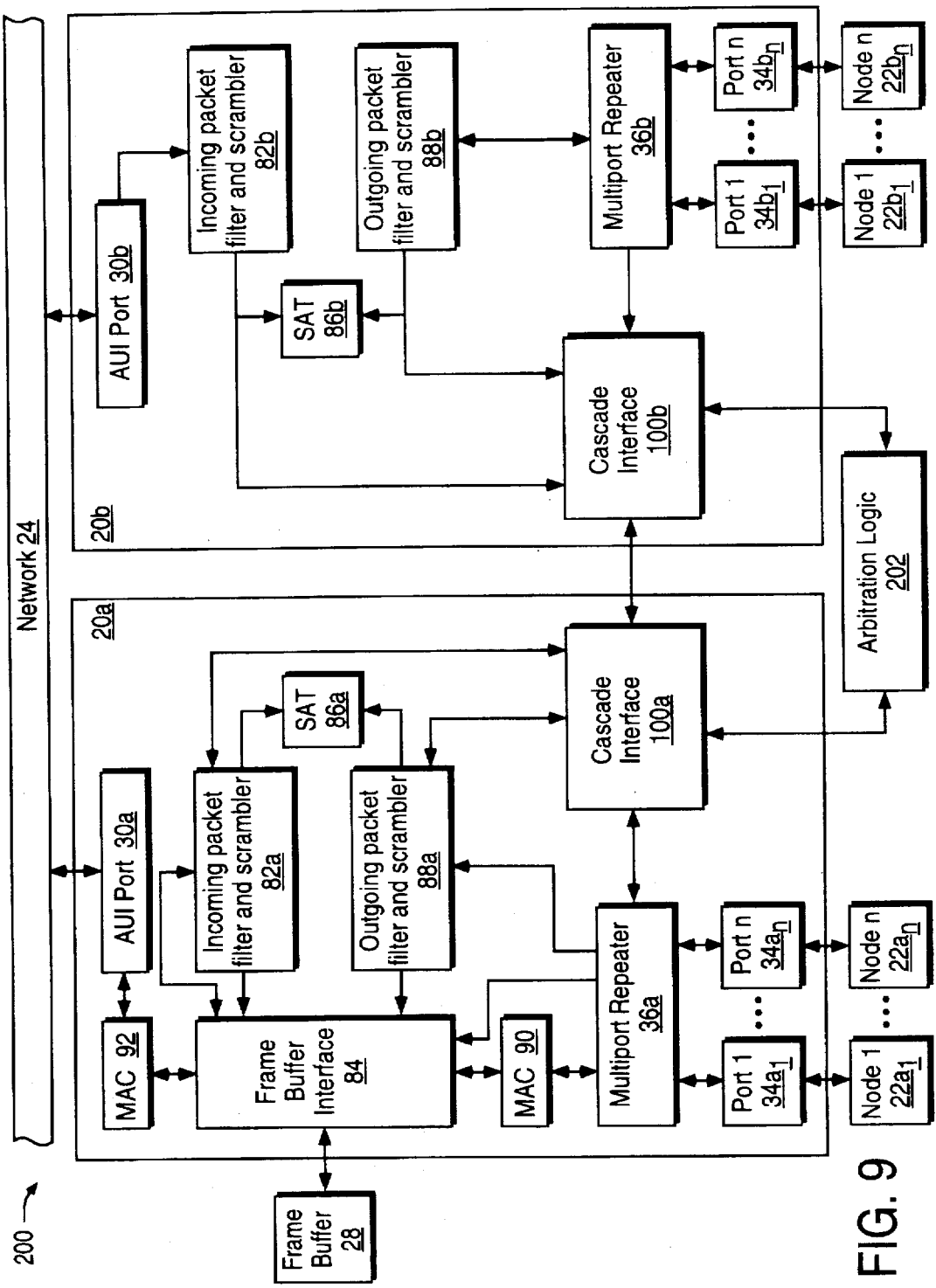
FIG. 9 is a block diagram of a system wherein a plurality of apparatuses 20a, 20b are cascaded together.

In actual implementation, apparatus 20 comprises an arbitrary number n of working ports for interfacing with an n number of nodes. Regardless of the number n, it is possible that some applications will find this number of working ports to be insufficient. In such applications, it would be desirable to couple additional working ports to apparatus 20 without modifying the basic configuration of the apparatus 20. Cascade interface 100 provides apparatus 20 with this capability. Specifically, interface 100 gives apparatus 20 the ability to couple to another apparatus 20. FIG. 9 provides a block diagram of a system 200 wherein two apparatuses 20a, 20b are cascaded together to form a single network interfacing apparatus capable of interfacing 2×n working ports, and hence, 2×n nodes to network 24. The cascade interface of the present invention will be described in the context of a two-apparatus system but it should be noted that the cascade interface may be used to cascade together any number of apparatuses.

Several points should be noted with regard to FIG. 9. First, note that even though there are two apparatuses 20a, 20b, there is only one external frame buffer 28. This one frame buffer 28 is used to buffer packets from both apparatuses. Second, when two or more apparatuses are cascaded together, only one of the apparatuses (apparatus 20a in FIG. 9) is in master mode. All other apparatuses (apparatus 20b) are in slave mode. This distinction is important because only the master apparatus 20a may interface with and manipulate the external frame buffer 28. In actual implementation, apparatus 20b is preferably identical to apparatus 20a, which means that apparatus 20b also has a frame buffer interface (not shown) and MAC's 90, 92. However, because apparatus 20b is in slave mode and thus has its frame buffer interface deactivated, the frame buffer interface and MAC's are not shown in apparatus 20b for the sake of simplicity. Third, note that each apparatus performs its own packet filtering function. Each apparatus 20a, 20b comprises its own source address table 86a, 86b for storing the addresses of its working ports, and each apparatus receives incoming and outgoing packets and individually determines whether these packets are destined for one of its own working ports. Because each apparatus performs its own filtering functions, the cascade interfaces 100a, 100b need not become involved in this process. The primary function of interfaces 100a, 100b is to provide a mechanism for coordinating the passing of data and control signals between the apparatuses. A fourth point to note is that, because multiple apparatuses are involved, system 200 preferably further includes arbitration logic 202 for coordinating the transfer of information between the apparatuses. Arbitration logic 202 prevents inter-apparatus data packets from colliding. Arbitration logic 202 may be provided externally or it may be incorporated into one or more of the apparatuses 20a, 20b.

Figure 10:
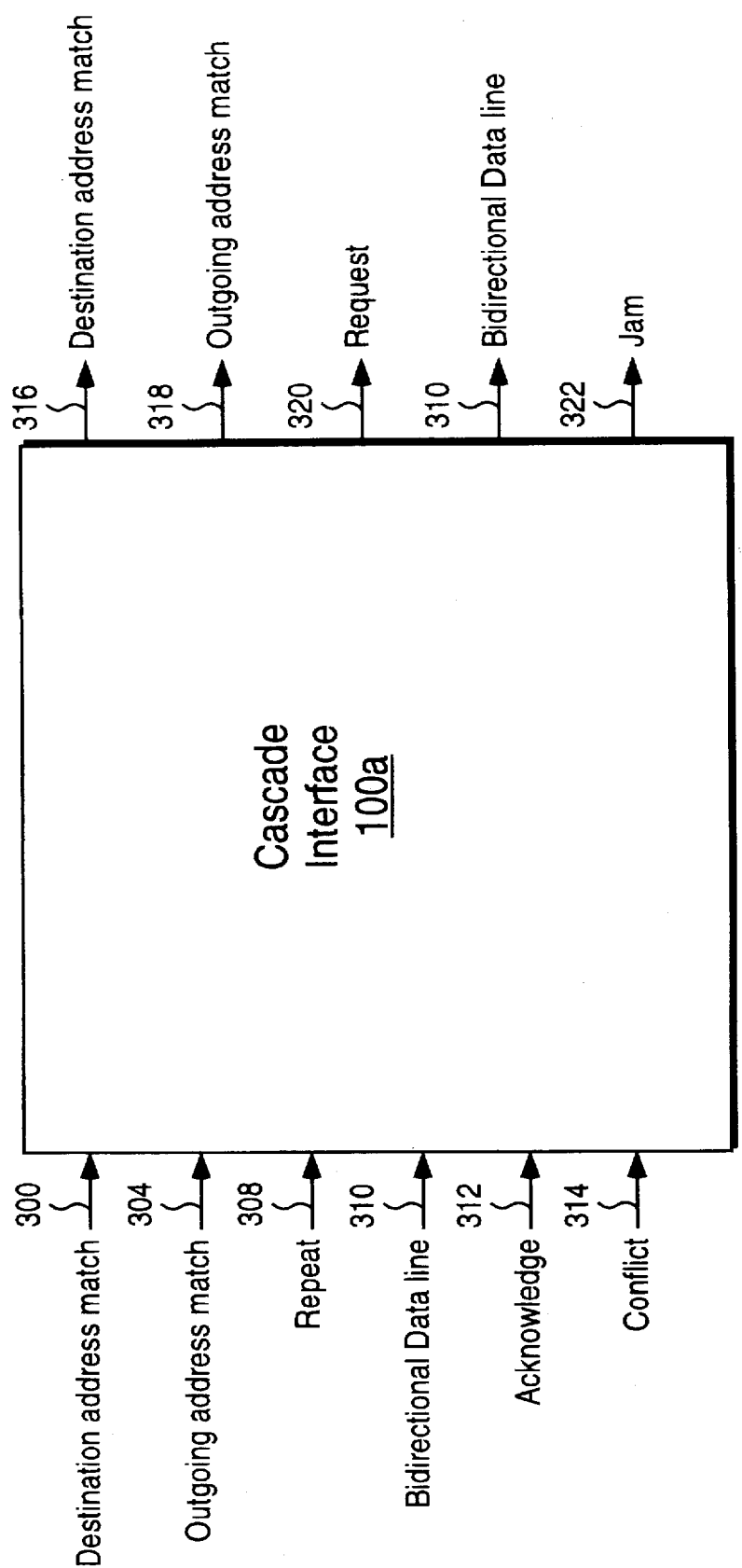
FIG. 10 is a block diagram of cascade interface 100a showing the inputs to and outputs from the interface.

With these points in mind, the cascade interfaces 100a, 100b will now be described. Referring to FIG. 10, there is shown a block diagram of interface 100a of the master apparatus 20a showing the input signals received, and the output signals provided by interface 100a. Interface 100a is coupled to and receives input signals from three sources: cascade interface 100b, multiport repeater 36a, and arbitration logic 202. From cascade interface 100b, cascade interface 10a receives a destination address match signal 300 and an outgoing address match signal 304, respectively. These signals indicate to interface 100a whether an address match has been found in apparatus 20b. In addition, interface 100 receives a "repeat" line 308 and a bidirectional data line 310 from repeater 36a, and an "acknowledge" line 312 and a "conflict" line 314 from arbitration logic 202. The repeat line indicates whether repeater 36a wishes to broadcast data on the data line 310, and the acknowledge and conflict lines 312, 314 indicate whether interface 100a may send data to the other cascade interface 100b.

As outputs, interface 100a provides a destination address match line 316 to filter 82a, an outgoing address match line 318 to filter 88a, a request line 320 to arbitration logic 202, a bidirectional data line 310 to both cascade interface 100b and repeater 36a, and a jam line 322 to repeater 36a. The address match lines 316, 318 relay the address match signals 300, 304 from cascade interface 100b to the filters 82a, 88a. These signals 300, 304 provide information needed by filters 82a, 88a to determine whether to receive incoming packets and whether to transmit outgoing packets. The request line 320 is used to submit a request to the arbitration logic 202 for permission to send information on the bidirectional data line 310. The jam line 322 is used to instruct the repeater 36a to send jam signals to the nodes $22a_1$–$22a_n$. The purposes served by these various signals will become clear as the operation of cascade interface 100a is described.

Figure 11:
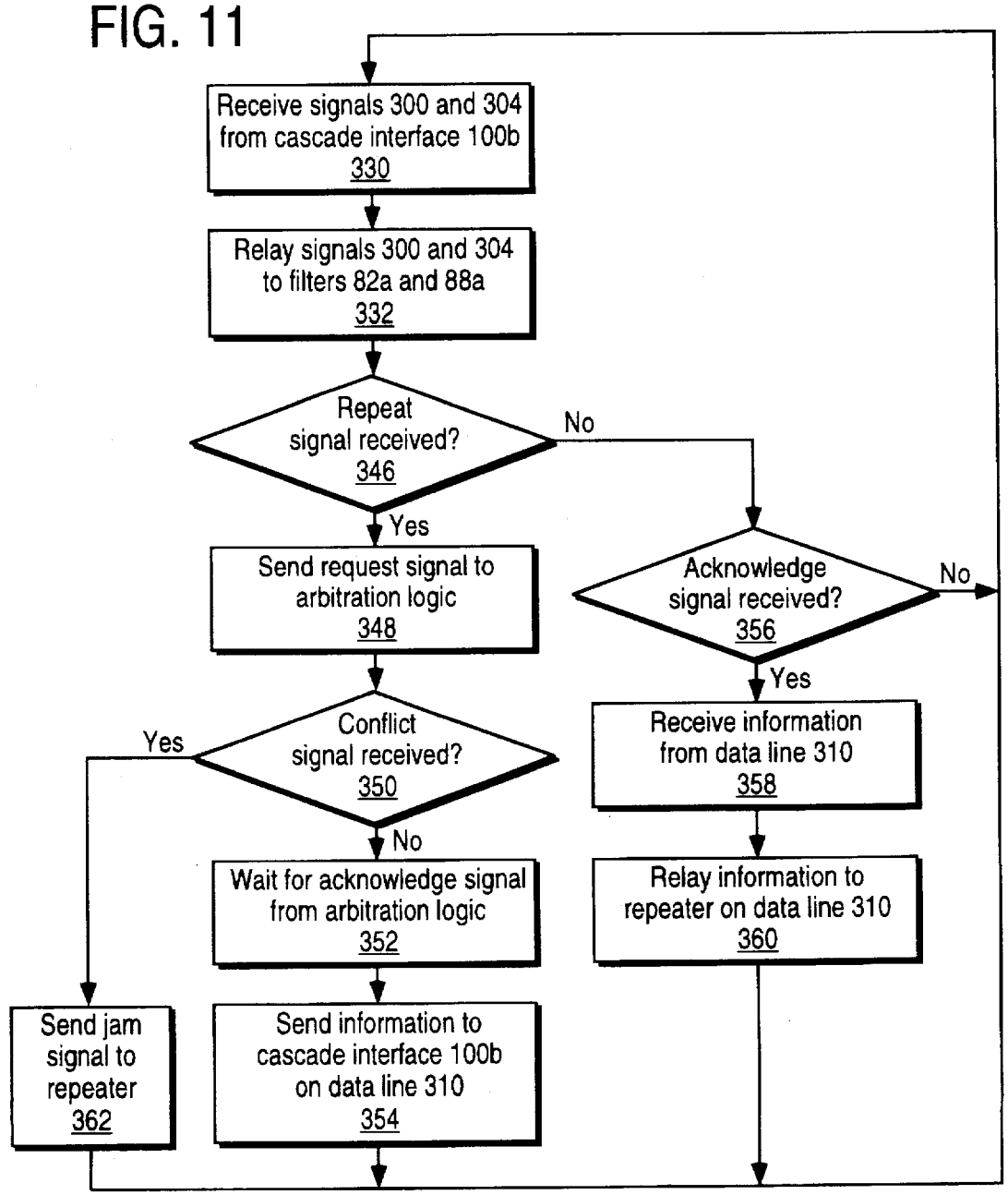

Referring now to FIG. 11, there is provided an operation flow diagram for cascade interface 100a. In the preferred embodiment, interface 100a is implemented using hardware logic, but it should be noted that interface 100a may also be implemented by way of a processor and a software program. With reference to FIGS. 9–11, cascade interface 100a begins operation by receiving 330 destination address match signal 300 and outgoing address match signal 304 from cascade interface 100b, and relaying 332 these signals 300, 304 to filters 82a and 88a, respectively, via lines 316 and 318. These signals are used by filters 82a and 88a to control the frame buffer interface 84.

To elaborate, in normal operation, filter 82a causes the frame buffer interface 84 to store an incoming packet in frame buffer 28 if the destination address of the incoming packet matches one of the addresses in SAT 86a. In master mode, filter 82a performs an extra function. Specifically, filter 82a takes into consideration whether a destination address match has been found in any of the apparatuses, not just in apparatus 20a. Thus, in system 200, filter 82a sends a "send" control signal to buffer interface 84 if either signal 300 is asserted (thereby indicating that a destination address match was found in apparatus 20b) or if a destination address match is found in apparatus 20a. This "send" signal causes the buffer interface 84 to finish storing the incoming packet in frame buffer 28 and to forward the packet on to one of the working ports 34. If, on the other hand, a destination address match is not found in either apparatus 20a or 20b, filter 82a sends a "prevent" signal to buffer interface 84 to cause the incoming packet to be discarded.

Filter 88a functions in a similar manner. Specifically, in master mode, filter 88a takes into consideration whether an outgoing address match has been found in either apparatus 20a or 20b. If either signal 304 is asserted (thereby indicating that an outgoing address has been found in apparatus 20b) or an outgoing address match is found in apparatus 20a, filter 88a sends a "prevent" signal to frame buffer interface 84. This signal causes interface 84 to discard the outgoing packet so that the packet is not transmitted to the network 24. If, however, an outgoing address match is not found in either apparatus 20a or 20b, then filter 88a sends a "send" signal to buffer interface 84 to cause the outgoing packet to be stored and forwarded to network 24.

Referring again to FIG. 11, after relaying signals 300 and 304 to filters 82a and 88a, interface 100a proceeds to step 346 wherein interface 100a determines whether a repeat signal has been received from repeater 36a. This repeat signal is generated by repeater 36a whenever repeater 36a has information to broadcast. If a repeat signal has been received, interface 100a sends 348 a request signal to arbitration logic 202 to request permission to send information on data line 310. If a conflict signal is received 350 from arbitration logic 202, it means that more than one interface is requesting to send information on line 310. If this is the case, interface 100a sends 362 a jam signal to the repeater 36a on jam line 322 to inform the repeater 36a that transmission is not currently possible. In response, repeater 36a sends a notification signal to each of the ports 34a to instruct the ports not to send information at this time. If, however, a conflict signal is not received, interface 10a waits 352 for an acknowledgment signal from arbitration logic 202, and when this signal is received, interface 100a sends 354 the information from repeater 36a to cascade interface 100b on data line 310. Information is thus conveyed from apparatus 20a to apparatus 20b.

Returning to step 346, if no repeat signal is received from repeater 36a, interface 100a determines 356 whether an acknowledge signal has been received from arbitration logic 202. If an acknowledgment signal is received without a request being sent, it means that another apparatus 20b has been given permission to send information using data line 310. In such a case, interface 100a receives 358 information from data line 310, and relays 360 this information to repeater 36a for broadcasting to the working ports $34a_1$–$34a_n$. Thereafter, interface 100a loops back to step 330 to repeat the process. Interface 100 thus coordinates the interaction between the two apparatuses 20a, 20b.

Figure 12:
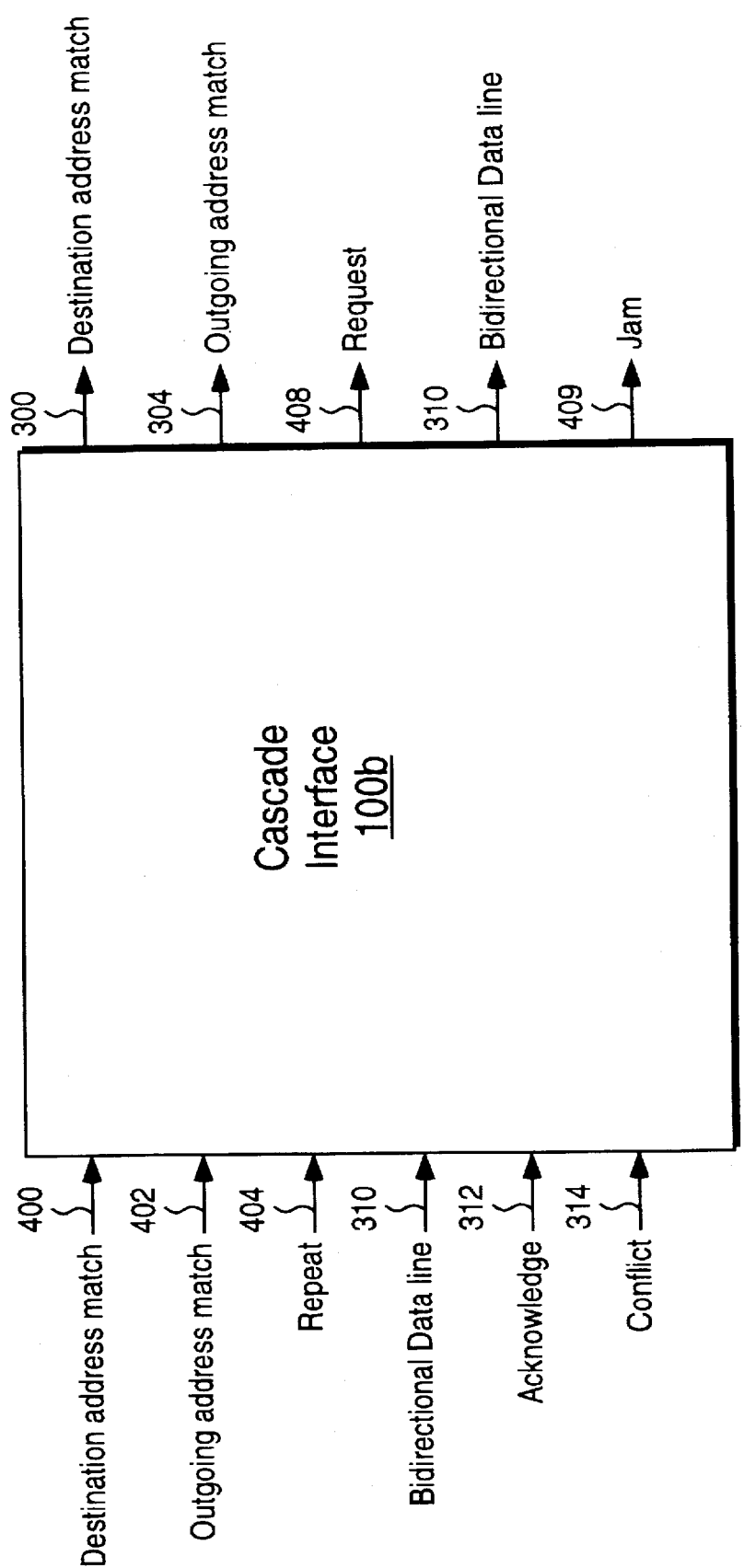
FIG. 12 is a block diagram of cascade interface 100b showing the inputs to and outputs from the interface.
Figure 13:
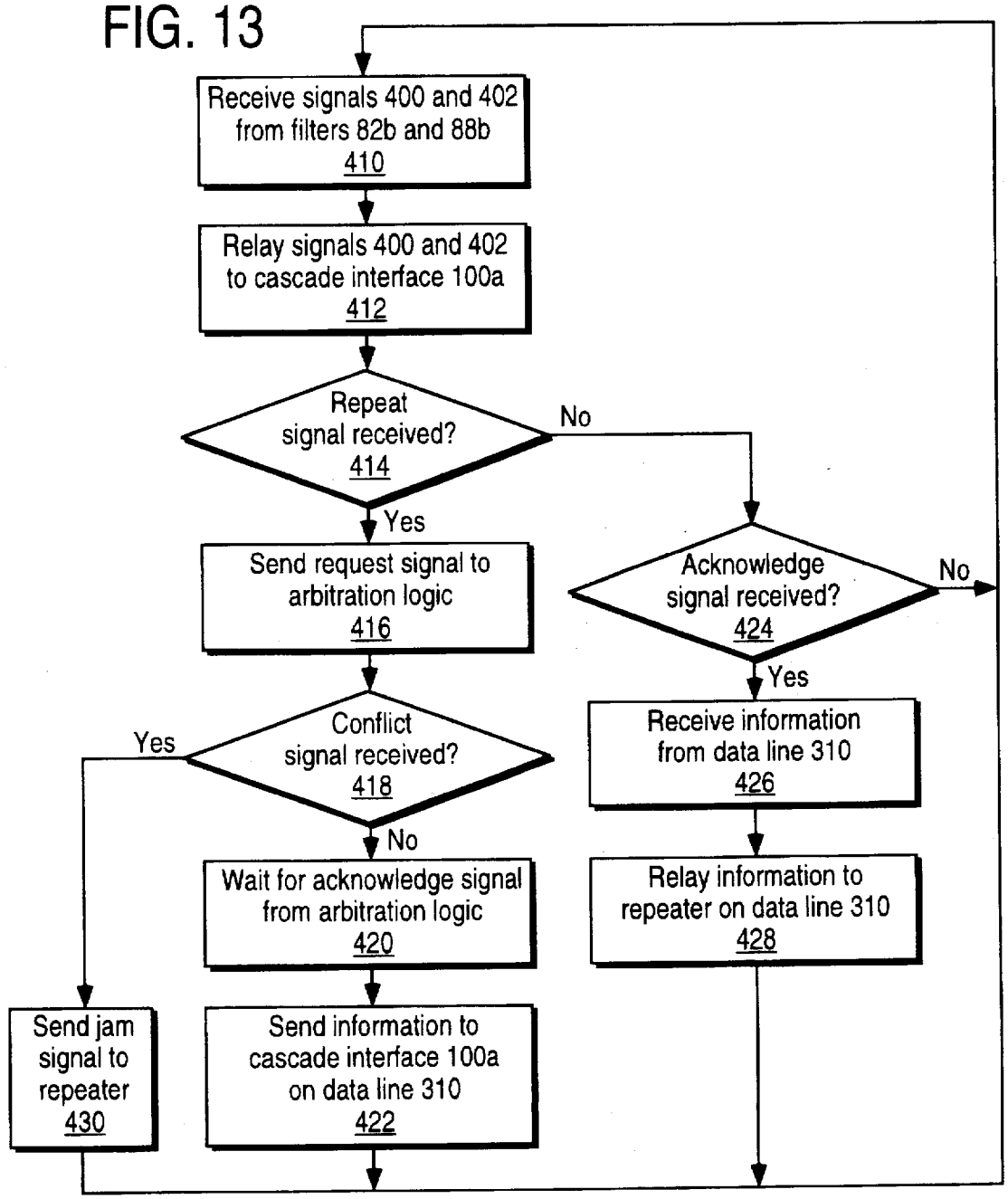
FIG. 13 is an operational flow diagram for the cascade interface 100b.

Cascade interface 100b functions in a similar but simpler fashion since it need not concern itself with the buffer interface 84. A block diagram showing the inputs and outputs, and an operational flow diagram for interface 100b are shown, respectively, in FIGS. 12 and 13. Interface 100b receives the following as inputs: a destination address match line 400 from filter 82b; an outgoing address match line 402 from filter 88b; repeat line 404 and data line 310 from repeater 36b; and the acknowledge 312 and conflict 314 lines from arbitration logic 202. As outputs, interface 100b provides destination and outgoing address match lines 300, 304 to cascade interface 100a, request line 408 to arbitration logic 202, data line 310 to both repeater 36b and cascade interface 100a, and jam line 409 to repeater 36b.

In operation, interface 100b receives 410 the address match signals 400, 402 from filters 82a and 82b, respectively, and relays 412 these signals to cascade interface 100a via lines 300, 304. The signals on lines 300, 304 indicate to cascade interface 100a whether a destination address match or an outgoing address match has been detected by apparatus 20b. After relaying signals 300 and 304, interface 100b proceeds to determine 414 whether a repeat signal has been received from repeater 36b. If so, it means that repeater 36b has information to broadcast. In response, interface 100b sends 416 a request to arbitration logic 202 for permission to broadcast data on line 310. If a conflict signal is received from logic 202, interface 100b sends 430 a jam signal to repeater 36b on jam line 409. In response, repeater 36b sends a notification signal to the ports 34b to instruct the ports not to send information at this time. If, however, a conflict signal is not received, interface 100b waits 420 for an acknowledge signal from arbitration logic 202. When this signal is received, interface 100b sends 422 the information from repeater 36b to interface 100a via data line 310. Information is thus transferred from apparatus 20b to apparatus 20a.

Referring again to step 414, if no repeat signal is received but an acknowledge signal is received from arbitration logic 202, it means that information is being broadcasted from another apparatus 20a. In response, interface 100b receives 426 the information from data line 310 and relays 428 it to repeater 36b on data line 310. Repeater 36b thereafter broadcasts the information to working ports $34b_1\_34_n$.

Figure 14:
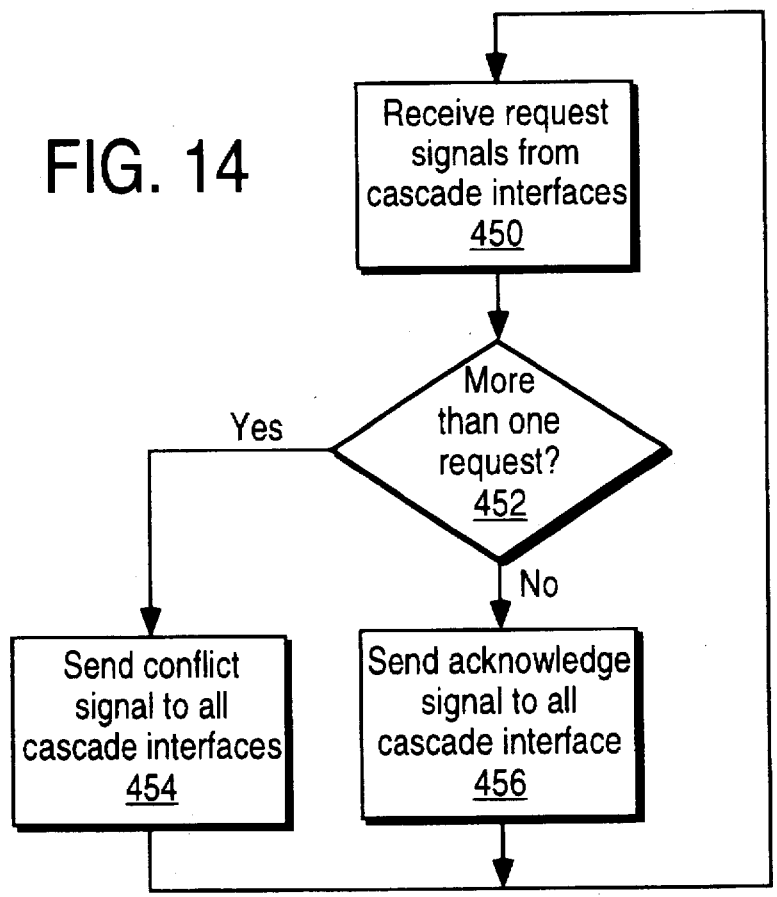
FIG. 14 is an operational flow diagram for arbitration logic 202.

Referring now to FIG. 14, there is shown an operational flow diagram for arbitration logic 202. Logic 202 begins operation by receiving 450 from all of the cascade interfaces 100a, 100b request signals. If more than one request signal is received 452, arbitration logic 202 cannot accommodate all of the requests. Thus, logic 202 sends 454 a conflict signal to the cascade interfaces 100a, 100b. On the other hand, if only one request is received, logic 202 sends 456 an acknowledge signal to all of the cascade interfaces. This acknowledge signal informs the requesting cascade interface that it may broadcast information. This signal also lets the other cascade interfaces know that information is forthcoming so that they can prepare for receiving the information. Arbitration logic thus coordinates the flow of information between the apparatuses. In the preferred embodiment, arbitration logic 202 is implemented using hardware logic, but it should be noted that logic 202 may also be implemented by way of a processor and software. This and other modifications are within the spirit of the present invention.

What is claimed is:

1. A network interfacing apparatus comprising:
   plurality of working ports, not directly connected to each other, coupled to a plurality of nodes;
   a repeater for coupling to each working port;
   an address table for storing addresses of said working ports;
   an attachment port, not directly connected to the repeater, coupled to a network for receiving an incoming information packet therefrom, and sending an outgoing information packet thereto, said incoming packet containing a destination address;
   an incoming packet controller coupled to said address table, said attachment port, said repeater, and said working ports through said repeater, said controller determining whether said destination address matches any of the addresses stored in said address table, and in response to a destination address match, said controller sending said incoming packet to said working ports;
   packet scrambler coupled to the incoming packet controller for providing a scrambled information packet so that in response to a destination address match, the corresponding working port receives the incoming information packet and at least one other working port receives the scrambled information packet; and
   an outgoing packet controller coupled to said address table, said attachment port, said repeater, and said working ports through said repeater, said outgoing controller receiving said outgoing information packet from one of said working ports, and determining whether an outgoing address contained in said outgoing packet matches any of the addresses stored in said address table, and if no outgoing address match is found, said controller sending said outgoing packet to said network via said attachment port.

2. The apparatus of claim 1, wherein said controller prevents said incoming packet from being sent to said working ports if no destination address match is found.

3. The apparatus of claim 1 further comprising:
   an address table controller coupled to said working ports and said address table for determining whether all of said working ports are active, said address table controller removing the address of any inactive working port from said address table.

4. The apparatus of claim 1 further comprising:
   a repeater for coupling said working ports to each other.

5. The apparatus of claim 4 further comprising:
   cascade interface for coupling external working ports to said repeater to increase the number of working ports interfaced by said apparatus.

6. The apparatus of claim 4, further comprising arbitration logic for coordinating information transfer between said cascade interface and said external working ports.

7. The apparatus of claim 1; wherein said outgoing controller prevents said outgoing packet from being sent to said network if an outgoing address match is found.

8. The apparatus of claim 1, wherein said incoming controller prevents said incoming packet from being sent to said working ports if no destination address match is found.

9. The apparatus of claim 7, wherein said incoming controller prevents said incoming packet from being sent to said working ports if no destination address match is found.

10. The apparatus of claim 1 further comprising:
    packet scrambler for providing a scrambled information packet to at least one of said working ports having an address which does not match said destination address.

11. The apparatus of claim 1 further comprising:
    a packet scrambler for providing a scrambled information packet to at least one of said working ports having an address which does not match said outgoing address.

12. The apparatus of claim 1 further comprising:
    an address table controller coupled to said working ports and said address table for determining whether all of said working ports are active, said address table controller removing the address of any inactive working port from said address table.

13. The apparatus of claim 1, wherein said outgoing packet contains a source working port address, and wherein said apparatus further comprises:
    an address table controller coupled to said working ports and said address table for receiving said outgoing packet and determining whether said source working port address matches any of the addresses stored in said address table, and if no match if found, said address table controller storing said source working port address in said address table.

14. The apparatus of claim 1 further comprising:
    cascade interface for coupling external working ports to said repeater to increase the number of working ports interfaced by said apparatus.

15. The apparatus of claim 14 further comprising arbitration logic for coordinating information transfer between said cascade interface and said external working ports.

16. A method for interfacing a plurality of working ports having addresses associated therewith to a network, with the ports not directly connected to each other, but each coupling to a repeater, the method comprising the steps of:

receiving an incoming information packet having a destination address contained therein;

determining whether said destination address matches any of the addresses associated with the working ports;

sending said incoming information packet to said working ports through the repeater if a destination address match is found so that the working port corresponding to the destination address receives the incoming information packet;

sending a scrambled information packet to the working ports if the destination address match is found so that at least one working port having an address which does not match said destination address receives the scrambled information packet;

receiving an outgoing information packet from one of said working ports through the repeater, said outgoing packet containing an outgoing address;

determining whether said outgoing address matches any of the addresses associated with the working ports; and sending said outgoing information packet to the network if an outgoing address match is not found.

17. The method of claim 16 further comprising the step of:

preventing said incoming information packet from being sent to said working ports if a destination address match is not found.

18. The method of claim 16 further comprising the steps of:

preventing said outgoing information packet from being sent to the network if an outgoing address match is found.

19. The method of claim 16 further comprising the step of:

sending a scrambled information packet instead of said incoming information packet to at least one of said working ports having an address which does not match said destination address.

20. The method of claim 16 further comprising the step of:

sending a scrambled information packet to at least one of said working ports having an address which does not match said outgoing address.

* * * * *